No. 642,013. Patented Jan. 23, 1900.
J. SHELLABARGER.
DRIVING MECHANISM FOR BICYCLES.
(Application filed Mar. 3, 1899.)
(No Model.)
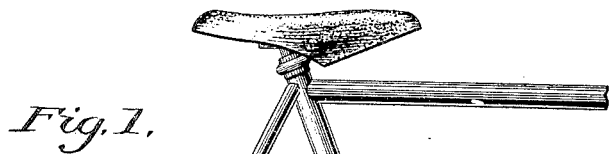
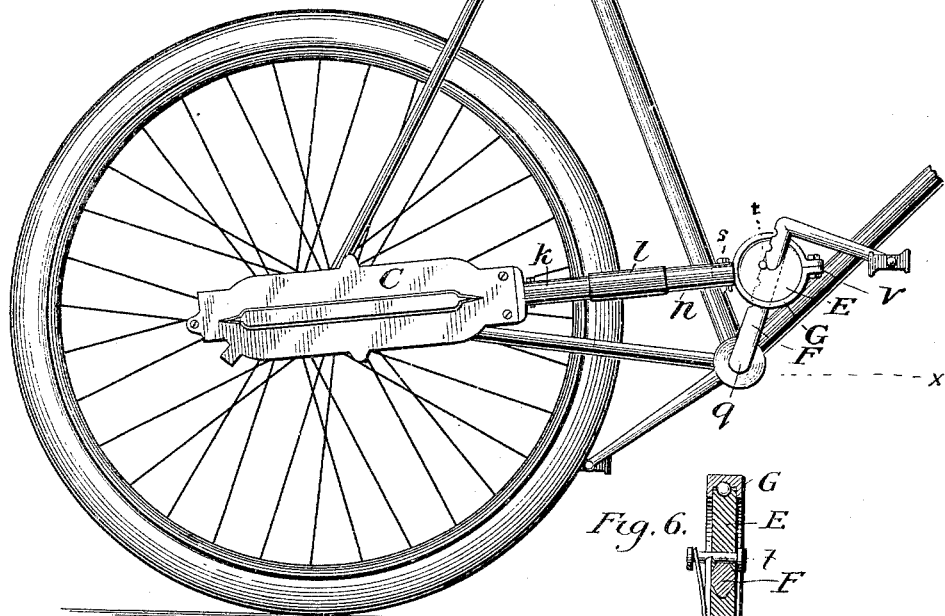
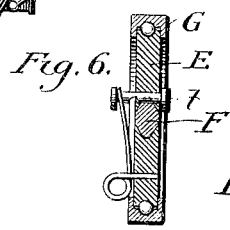
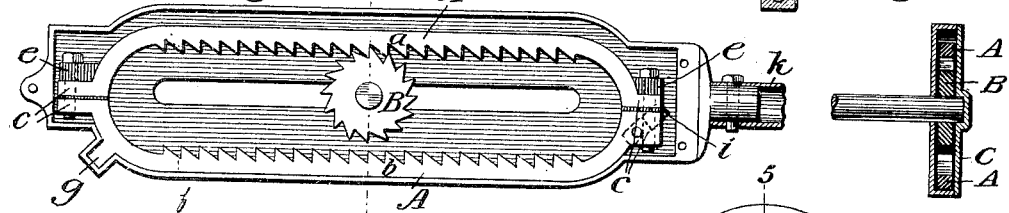
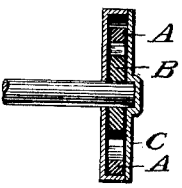
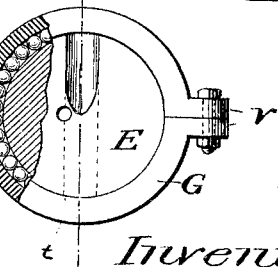
Witnesses.
Geo. M. Russell
J. C. Pennell
Inventor.
Joshua Shellabarger
THE NORRIS PETERS CO., PHOTO-LITHO., WASHINGTON, D. C.

UNITED STATES PATENT OFFICE.

JOSHUA SHELLABARGER, OF ROCKFORD, OHIO, ASSIGNOR OF ONE-FOURTH TO C. S. MAUK, OF SAME PLACE.

DRIVING MECHANISM FOR BICYCLES.

SPECIFICATION forming part of Letters Patent No. 642,013, dated January 23, 1900.

Application filed March 3, 1899. Serial No. 707,690. (No model.)

*To all whom it may concern:*

Be it known that I, JOSHUA SHELLABARGER, a citizen of the United States, residing at Rockford, in the county of Mercer and State of Ohio, have invented a new and useful Improvement in Driving Mechanism for Bicycles; and I do hereby declare that the following is a full, clear, and exact description of the invention, which will enable others skilled in the art to which it relates to make and use the same, reference being had to the accompanying drawings, and to letters of reference marked thereon, which form a part of this specification.

My invention relates to improvements in driving mechanism for bicycles, and pertains to that class of bicycles known as "chainless" bicycles.

The object of my invention is to do away with the chain and to provide a chainless bicycle which is simple in construction, cheap, and effective in its operation.

Another object of my invention is to provide a chainless bicycle the gear of which can be readily changed to various different gears without dismounting from the wheel.

In the accompanying drawings, Figure 1 is a perspective view of the rear portion of a bicycle with my device attached thereto. Fig. 2 is a side view of the casing with one side removed, showing the rack and pinion in relation to each other. Fig. 3 is a transverse section of the casing, taken on line 3 3 of Fig. 2. Fig. 4 is a longitudinal part-sectional view of the pitman and its connection with the crank-arm. Fig. 5 is a transverse sectional view taken on line 5 5 of Fig. 4. Fig. 6 is a horizontal transverse sectional view of the gear-changing mechanism.

Referring now to the drawings, A indicates a yoke which is loosely situated within a casing C.

B is a pinion which is situated on the end of the axle of the rear wheel of a bicycle, said axle extending through an elongated opening in the casing C.

The yoke A is composed of two sections $a$ and $b$, each section having a rack-bar with its teeth pointing in opposite directions and having outwardly-extending ears $c\ c$ at either end, said ears being provided with bolt-openings. A bolt $d$ passes through the ears of the sections and through a rubber block $e$, which allows the expansion of the yoke. The yoke A is loosely situated within the casing—that is, the frame has at one end a projection $g$, which rides up and down in a recess in the casing, and at the other end the yoke is provided with a pin $f$, which enters an oblique opening $i$ in the casing, thereby limiting and guiding the movement of the frame. The casing has one end attached to a pitman which is formed of three sections.

$k$ and $n$ are two pipes with a transverse web across them near one end. L is a similar pipe or hollow casting with a transverse web at its center and rubber blocks $o\ o$ situated within said pipe on either side of the web, and the ends of the sections $k$ and $n$ entering section L and abutting the rubber blocks $o\ o$. A bolt R passes through the web of the section $n$, the blocks $o\ o$, the web of the section L, and then through the web of the section $k$ for securing the three sections together.

The crank-shaft extends through the crank-hanger and has a crank-arm F, which has on one face a series of transverse grooves or recesses $p$. A disk E surrounds the crank-arm F and has an oblique opening H, which receives the crank. The crank is not at right angles to the shaft, but has an angle to correspond with the opening in the disk, whereby the disk is in a perpendicular position. The outer edge of the disk E has a ball-race, and surrounding this is a ring or collar G, having a ball-race on its inner circumference. The said collar is formed of two sections, having at its outer portions ears $v\ v$, which are bolted together, and the inner ends having projections $m\ m$, which extend into the section $n$ of the pitman and are held therein by a bolt $s$. At one side of the oblique opening H and near the center of the disk is a transverse opening I. Situated within the opening I is a pin $l$, which is longer than the thickness of the disk and is provided at either side with a head. Intermediate said heads is a transverse recess Q to register with the crank-arm. Attached to one end of the bolt $l$ is a spring P, which has its other end attached to the disk E. The tendency of the spring P is to hold the pin $l$ in the groove in the crank-arm, but by pressing said pin in the transverse recess Q will allow the crank-arm to slide within the disk, and thereby the disk E can be lowered or raised on the crank-arm and thereby limit the length of the stroke and changing the gear. A large gear can be obtained by moving the disk on the crank-arm away from the center and a small gear by moving it nearer the center.

The operation of my device is as follows: When the pitman, which is connected to the casing, passes the line $x$ and starts on its rearward stroke, the pinion continues to revolve, and the upper rack-bar resting thereon will be raised up and thus cause the lower rack at $f$ to engage slightly with the pinion, and the moment this occurs the tendency of the rack-frame is to move forward in the casing, and on its forward movement it rides up in an oblique slot and thus causes a full engagement of the lower rack with the pinion.

Having thus described my invention, what I claim, and desire to secure by Letters Patent, is—

1. In a bicycle, the combination with a pitman, of a ring connected to one end of said pitman, a disk within said ring and having a ball-bearing connection therewith, said disk having an oblique opening therethrough and a crank extending through said opening, substantially as described.

2. In a bicycle, the combination with a pitman, of a ring connected to one end of said pitman, a disk within said ring and having a ball-bearing connection therewith, said disk having an oblique opening therethrough, a spring-retained pin extending transversely through the disk adjacent said opening and a crank extending through the oblique opening and having transverse recesses to receive the pin, substantially as described.

3. In a bicycle, the combination with a driving-wheel, of a pitman connected thereto consisting of a hollow middle section having a transverse web in the center, elastic blocks on either side of said web, and sections having a transverse web near each end, and a clamping-bolt extending through the webs of the end sections and through the blocks and web of the middle section, substantially as described.

4. A driving mechanism for bicycles, comprising a casing, a pinion within the casing, a yoke surrounding the pinion and having a transverse movement in the casing, a pitman rigidly connected to the casing, a ring connected to the other end of the pitman, a disk within said ring and having a ball-bearing connection therewith, said disk having an oblique opening therethrough and a crank-arm extending through said opening, substantially as described.

5. A driving mechanism for bicycles comprising a casing, a pinion within the casing, a yoke surrounding the pinion and having a transverse movement in the casing, a pitman rigidly connected to the casing, a ring connected to the other end of the pitman, a disk within the ring and having a ball-bearing connection therewith, said disk having an opening obliquely therethrough, a spring-pressed pin extending transversely through the disk adjacent the oblique opening, and a crank having transverse recesses through the oblique opening whereby the disk can be raised or lowered on the crank, substantially as described.

JOSHUA SHELLABARGER.

Witnesses:
GEO. M. PENNELL,
J. C. PENNELL.